(12) United States Patent
Chilton (10) Patent No.: US 7,076,636 B1
(45) Date of Patent: Jul. 11, 2006

(54) DATA STORAGE SYSTEM HAVING AN IMPROVED MEMORY CIRCUIT BOARD CONFIGURED TO RUN SCRIPTS

(75) Inventor: Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 534 days.

(21) Appl. No.: 09/972,284

(22) Filed: Oct. 5, 2001

(51) Int. Cl.
*G06F 9/30* (2006.01)
*G06F 12/00* (2006.01)

(52) U.S. Cl. .......................... 712/34; 712/38; 712/225; 711/118; 711/113; 711/158

(58) Field of Classification Search ................ 712/225, 712/34, 38; 711/113, 155, 118, 158
See application file for complete search history.

(56) References Cited

U.S. PATENT DOCUMENTS

| | | | | |
|---|---|---|---|---|
| 5,278,974 | A * | 1/1994 | Lemmon et al. | 713/600 |
| 5,680,637 | A * | 10/1997 | Hotta et al. | 712/24 |
| 5,748,978 | A * | 5/1998 | Narayan et al. | 712/23 |
| 6,233,671 | B1 * | 5/2001 | Abdallah et al. | 712/221 |
| 6,237,077 | B1 * | 5/2001 | Sharangpani et al. | 712/24 |

OTHER PUBLICATIONS

Hennessy and Patterson, "Computer Architecture—A Quantitative Approach, 2$^{nd}$ Edition," 1996, p. 75.*

Kendell A. Chilton;"Methods and Apparatus for Accessing a Doubly Linked List in a Data Storage System"; Filed on Oct. 5, 2001.

Kendell A. Chilton;"Methods and Apparatus for Transferring a Data Element Within a Data Storage System"; filed Dec. 19, 2000; U.S. Appl. No. 09/741,494.

Kendell A. Chilton;"Methods and Apparatus for Accessing Data Elements Using Improved Hashing Techniques"; Filed on Oct. 5, 2001.

* cited by examiner

*Primary Examiner*—Eddie Chan
*Assistant Examiner*—David J. Huisman
(74) *Attorney, Agent, or Firm*—BainwoodHuang (57) ABSTRACT

A data storage system includes a set of storage devices, a memory circuit board that includes a cache to temporarily store copies of data elements stored in the set of storage devices, and a processor circuit board that operates as at least one of a front-end interface between an external device and the cache and a back-end interface between the cache and the set of storage devices. The memory circuit board is configured to receive, from the processor circuit board, a communication that includes a script command and a payload. The payload includes a series of individual instructions. The memory circuit board is further configured to parse the payload to identify the series of individual instructions in response to the script command, and to perform a series of operations in accordance with the identified series of individual instructions.

33 Claims, 6 Drawing Sheets

DATA STORAGE SYSTEM HAVING AN IMPROVED MEMORY CIRCUIT BOARD CONFIGURED TO RUN SCRIPTS

BACKGROUND OF THE INVENTION

A typical data storage system includes (i) a set of memory circuit boards which provides an input/output (I/O) cache and (ii) a set of disk drives. The I/O cache is volatile storage (i.e., semiconductor memory) that temporarily buffers data transferred between an external device (e.g., a host) and the set of disk drives.

One conventional data storage system further includes a front-end interface and a back-end interface. The front-end interface operates as an interface between the external device and the I/O cache by moving blocks of data (e.g., 512 byte sections) between the external device and the I/O cache. The back-end interface operates as an interface between the I/O cache and the set of disk drives by moving the data blocks between the I/O cache and the set of disk drives.

Each memory circuit board of the conventional data storage system is typically configured to respond to a small set of basic instructions such as READ, WRITE, ADD, and MASK-COMPARE-AND-SWAP commands. An interface (e.g., the front-end interface) can direct a memory circuit board to perform one of these basic instructions by sending a corresponding command and associated data to that memory circuit board. For example, a front-end interface can write data to the I/O cache by providing a WRITE command and a block of data to a memory circuit board, and subsequently provide another command to set the write pending bit corresponding to that cache slot. The memory circuit board responds to the WRITE command by storing the block of data in a cache slot, and to the subsequent command by setting the write pending bit. The back-end interface will subsequently detect the set write pending bit, copy the block of data from the cache slot to the set of storage devices and clear the write pending bit in order to synchronize the cache slot with the set of disk drives.

SUMMARY OF THE INVENTION

Unfortunately, there are deficiencies to the above-described conventional data storage system. For instance, in the above-described conventional data storage system, each interface of the data storage system provides a separate communication (e.g., a command and data) to the set of memory circuit boards each time that interface requires the set of memory boards to perform an operation. As a result, a task that involves several memory circuit board operations uses several separate communications. For example, a complex task such as updating a least-recently-used (LRU) queue involves many communications (e.g., ten communications) from an interface to the set of memory boards in order to accomplish that task. Another example of a task which uses many communications between an interface and the set of memory circuit boards is the task of updating a track table, or a set of hash lists, that tracks which blocks of data in the set of disk drives also reside in the cache. The large number of communications results in poor response time due to a variety of delays, e.g., handshaking delays in waiting for the memory circuit board to complete each operation incrementally before sending the communication for the next operation, resource contention delays due to contention for the interconnection mechanism (e.g., bus or buses) connecting the interface to the set of memory boards, etc.

Embodiments of the invention are directed to a data storage system which uses a memory circuit board which is configured to perform a series of operations in response to a communication that includes a script command and a payload (e.g., a series of individual instructions). The use of such a memory circuit board enables other circuit boards (e.g., front-end and back-end interfaces) to avoid sending many communications to the memory circuit board when directing the memory circuit board to perform a series of operations. Accordingly, complex tasks such as updating an LRU queue or updating a set of hash lists can be accomplished with fewer communications (e.g., a single communication) from an interface to the memory circuit board.

An embodiment of the invention is directed to a data storage system that includes (a) a set of storage devices (e.g., disk drives), (b) a memory circuit board that stores a cache to temporarily store copies of data elements stored in the set of storage devices, and (c) a processor circuit board that operates as a front-end interface between an external device and the cache, or a back-end interface between the cache and the set of storage devices. The memory circuit board is configured to receive, from the processor circuit board, a communication that includes a script command and a payload. The payload includes a series of individual instructions. The memory circuit board is further configured to parse the payload to identify the series of individual instructions in response to the script command, and to perform a series of operations in accordance with the identified series of individual instructions. Accordingly, the memory circuit board can be directed to perform the series of operations based on the series of parsed individual instructions contained within the communication from the processor circuit board (e.g., a front-end interface or a back-end interface). As a result, fewer communications (e.g., a single communication, a few communications, etc.) can occur to direct the memory circuit board to accomplish particular tasks thus lowering response time (e.g., due to less transmissions, less bus contention, little or no waiting for responses before sending subsequent communications, etc.).

In one arrangement, the cache includes memory locations which store a data element (instruction parameters, additional instructions, etc.), and an individual instruction of the series of individual instructions includes an address referencing the memory locations which store the data element. In this arrangement, the memory circuit board is configured to perform at least a portion of the series of operations by (i) selecting the data element based on the address of the individual instruction, (ii) retrieving the data element from the memory locations of the cache, and (iii) performing an operation based on the individual instruction. The operation uses the data element as at least one parameter of the operation. By accessing the data element (e.g., in an indirect addressing manner), the memory circuit board can access content not contained within the communication such as parameters which are used by the series of instructions, additional instructions and parameters for those additional instructions, and the like.

In one arrangement, the memory circuit board further stores an instruction library. In this arrangement, the series of individual instructions includes an instruction reference that points to a section of code of the instruction library. The memory circuit board is configured to perform at least a portion of the series of operations by referencing the section of the code of the instruction library based on the instruction reference, and executing the section of code. By referencing the section of the code of the instruction library in this manner, each individual instruction essentially can be a jump instruction to execute a code section (e.g., additional instructions).

In one arrangement, the memory circuit board is configured to receive the communication, parse the payload, and perform the series of operations as an atomic operation. Accordingly, the operation of the memory circuit board is well-suited for complex tasks such as updating shared data structures (e.g., an LRU queue, a hash list, a track table, etc.) which would otherwise require the use of specialized locking techniques (e.g., test-and-set mechanisms, semaphores, etc.) which require relatively large amount of overhead (e.g., additional memory, CPU cycles, etc.).

In some arrangements, the memory circuit board is further configured to generate a series of results in response to performing the series of operations, and to provide the series of results to the processor circuit board. For example, in one arrangement, the memory circuit board is configured to provide the series of results by packaging the series of results in a set of data blocks, and transferring the set of data blocks to the processor circuit board. Accordingly, the processor circuit board (i.e., the source of the communication) can monitor the operation of the memory circuit board (e.g., error check the operation of the memory circuit board, etc.).

In one arrangement, the memory circuit board is further configured to load a set of parameters into a set of registers of the memory circuit board to enable the set of parameters to be used when performing the series of operations. Accordingly, the processor circuit board can send the communication to the memory circuit board once in order to program the operation of the memory circuit board, and subsequently load the set of registers with parameters in a dynamic or on-the-fly manner, thus causing the memory circuit board to repeat the operation on parameters without having to reprogram the memory circuit board.

The features of the invention, as described above, may be employed in computerized systems (e.g., a data storage system, a general purpose computer system, etc.), devices and methods as well as other computer-related components such as those of EMC Corporation of Hopkinton, Mass.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to a data storage system that utilizes a memory circuit board which is configured to perform a series of operations in response to a communication having a script command and a payload (e.g., a series of individual instructions). The use of such a memory circuit board enables other circuit boards (e.g., front-end and back-end interfaces of the data storage system) to avoid sending a large number of communications to the memory circuit board when directing the memory circuit board to perform a series of operations. Accordingly, complex tasks such as updating an LRU queue or updating a set of hash lists can be accomplished with only one or a few communications from another circuit board (e.g., a processor circuit board) to the memory circuit board.

Figure 1:
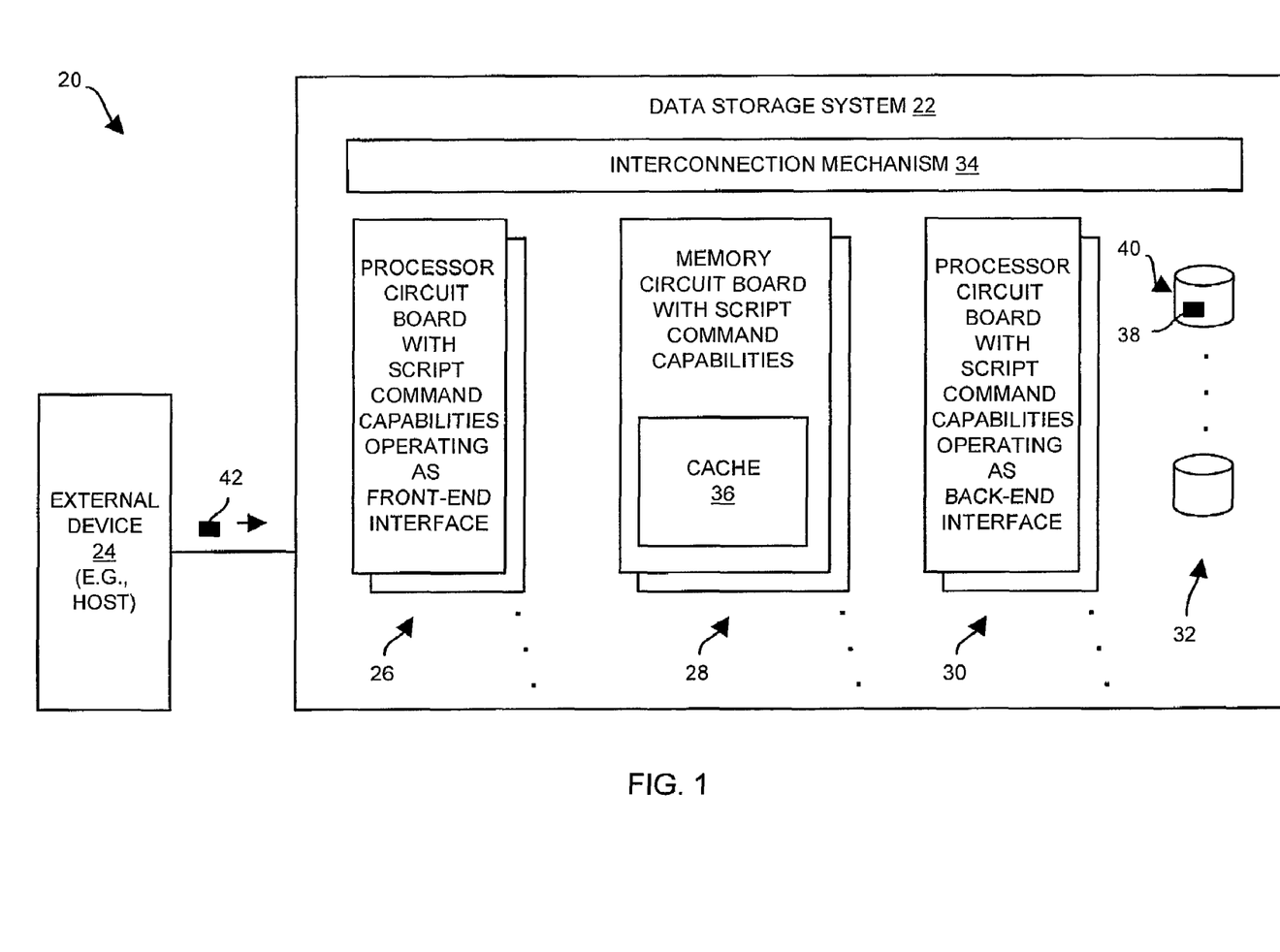
FIG. 1 is a block diagram of a data storage system which is suitable for use by the invention.

FIG. 1 shows a data storage configuration 20 which is suitable for use by the invention. The data storage configuration 20 includes a data storage system 22 and an external device 24 (e.g., a host, a server, etc.). The data storage system 22 includes a set of front-end interfaces 26, a set of memory circuit boards 28, a set of back-end interfaces 30, a set of disk drives 32 and an interconnection mechanism 34. The interconnection mechanism 34 (e.g., one or more backplanes for a set of buses or point-to-point channels, cables for block I/O communications, etc.) electrically couples the data storage system components 26, 28, 30, 32 together within a set of electronic cabinets.

In one arrangement, each front-end interface 26 and each back-end interface 30 resides on a single processor circuit board (or director board). In another arrangement, multiple interfaces 26, 30 (e.g., multiple front-end interfaces 26, multiple back-end interfaces 30, a combination of front-end and back-end interfaces 26, 30, etc.) reside on a single processor circuit board.

The set of memory circuit boards 28 holds a cache 36 for temporarily storing copies of data elements 38 which are stored in storage locations 40 on the set of disk drives 32. The set of back-end interfaces 30 operates as an interface between the cache 36 and the set of disk drives 32. Similarly, the set of front-end interfaces 26 operates as an interface between the external device 24 and the cache 36. In some arrangements and as shown in FIG. 1, the set of front-end interfaces 26 resides on multiple (i.e., more than one) processor circuit boards, and the set of back-end interfaces 30 also resides on multiple processor circuit boards for increased throughput and/or fault tolerance.

The cache 36 operates as a temporary buffer (i.e., volatile storage) for data elements 38, 42 exchanged between the external device 24 and the set of disk drives 32. When a copy of a data element 38 resides in the cache 36, the external device 24 can obtain the copy of the data element 38 from the cache 36 rather than retrieve the data element 38 from the set of disk drives 32. In some arrangements, the set of memory circuit boards 28 includes multiple memory circuit boards 28 for increased volatile storage capacity. When the set of memory circuit boards 28 includes multiple memory circuit boards 28, the cache 34 can be distributed across more than one memory circuit board 28 for load balancing purposes and/or fault tolerance.

Each interface 26, 30 is capable of providing basic commands to the set of memory circuit boards 28 such as READ, WRITE, MASK-COMPARE-AND-SWAP and ADD commands in order to direct the set of memory circuit boards 28 to perform particular operations (e.g., load a data element, store a data element, etc.). Each memory circuit board 28 is configured to handle those basic commands (e.g., load a data element in response to a READ command, store a data element in response to a WRITE command, etc.). As will be explained in further detail later, each interface 26, 30 is further capable of providing a communication that includes a SCRIPT command and a payload, and each memory circuit board 28 is capable of handling such a communication by parsing a series of instructions within the payload and performing a series of operations based on the parsed series of instructions. Accordingly, complex tasks for managing the cache 36 such as updating an LRU queue or updating a set of hash lists can be accomplished with fewer communications (e.g., a single communication) from an interface 26, 30 to the set of memory circuit boards 28. Further details of the invention will now be provided with reference to FIG. 2.

Figure 2:
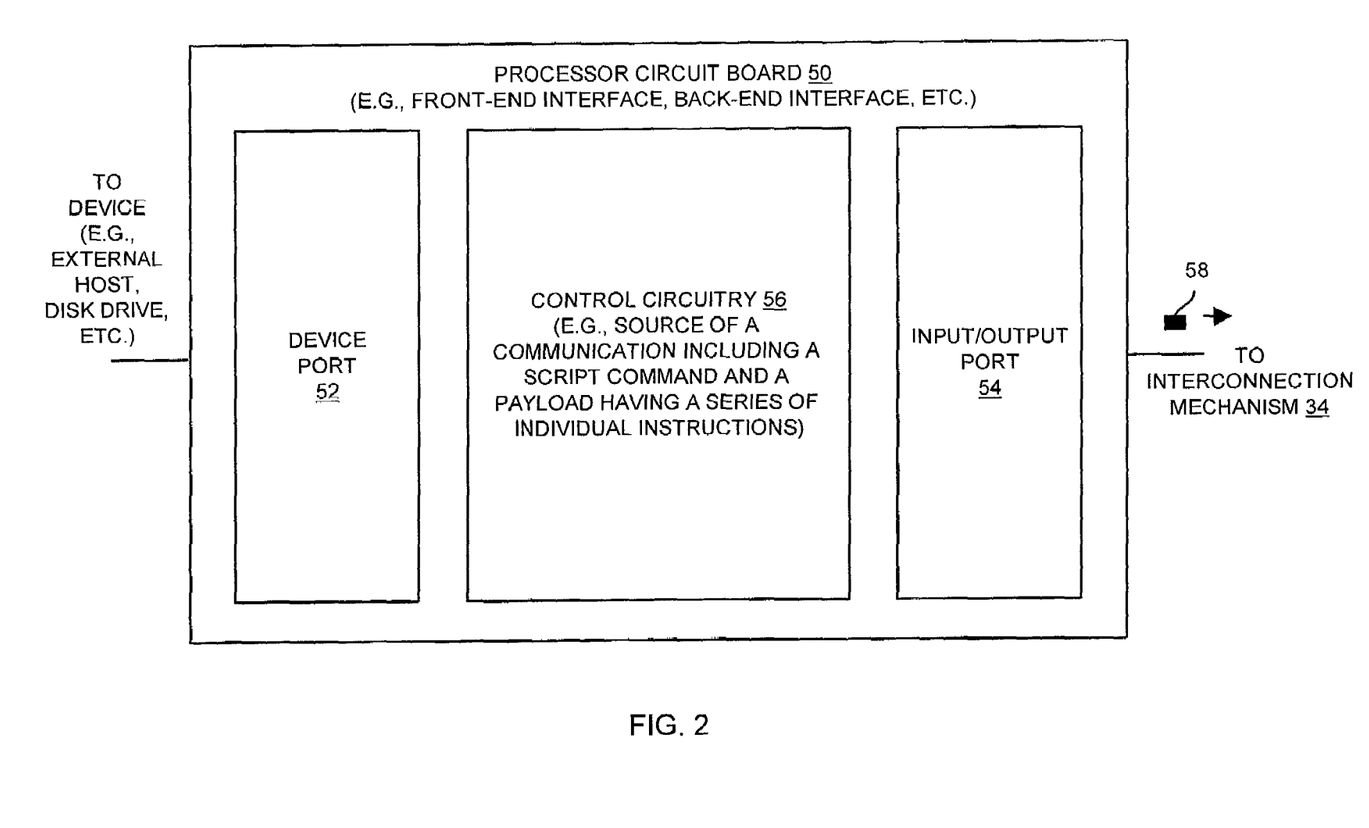
FIG. 2 is a block diagram of a processor circuit board of the data storage system of FIG. 1.

FIG. 2 is a block diagram of a processor circuit board 50 which is suitable for use as either the front-end interface 26 or the back-end interface 30 of the data storage system 22. The processor circuit board 50 includes a device port 52, an I/O port 54 and control circuitry 56. When the processor circuit board 50 operates as a front-end interface 52, the device port 52 connects with an external device (e.g., a host, a server, etc.). When the processor circuit board 50 operates as a back-end interface 52, the device port 52 connects with a storage device such as one of the set of disk drives 32 (also, see FIG. 1). The I/O port 54 connects with the set of memory circuit boards 28 through the interconnection mechanism 34 (e.g., a set of buses, a set of point-to-point channels, etc.).

The control circuitry 56 is capable of providing a set of basic commands (e.g., READ, WRITE, ADD and MASK-COMPARE-AND-SWAP commands) to the memory circuit board 28 in order to direct the memory circuit boards 28 to perform basic operations (e.g., load a data element, store a data element, etc.). The control circuitry 56 is further capable of providing a communication 58 which includes a SCRIPT command and a payload to the set of memory circuit boards 28 through the I/O port 54. The SCRIPT command distinguishes itself from other command because it is a unique set of bits in a command field of the communication 58 from the processor circuit board 50 to the set of memory circuit boards 28. The SCRIPT command indicates that the payload includes a series of individual instructions. In response to the SCRIPT command, the set of memory circuit boards 28 can parse the payload to identify the series of individual instructions. The memory circuit boards 28 can then perform a series of operations in accordance with the identified series of individual instructions. Further details of the invention will now be provided with reference to FIG. 3.

Figure 3:
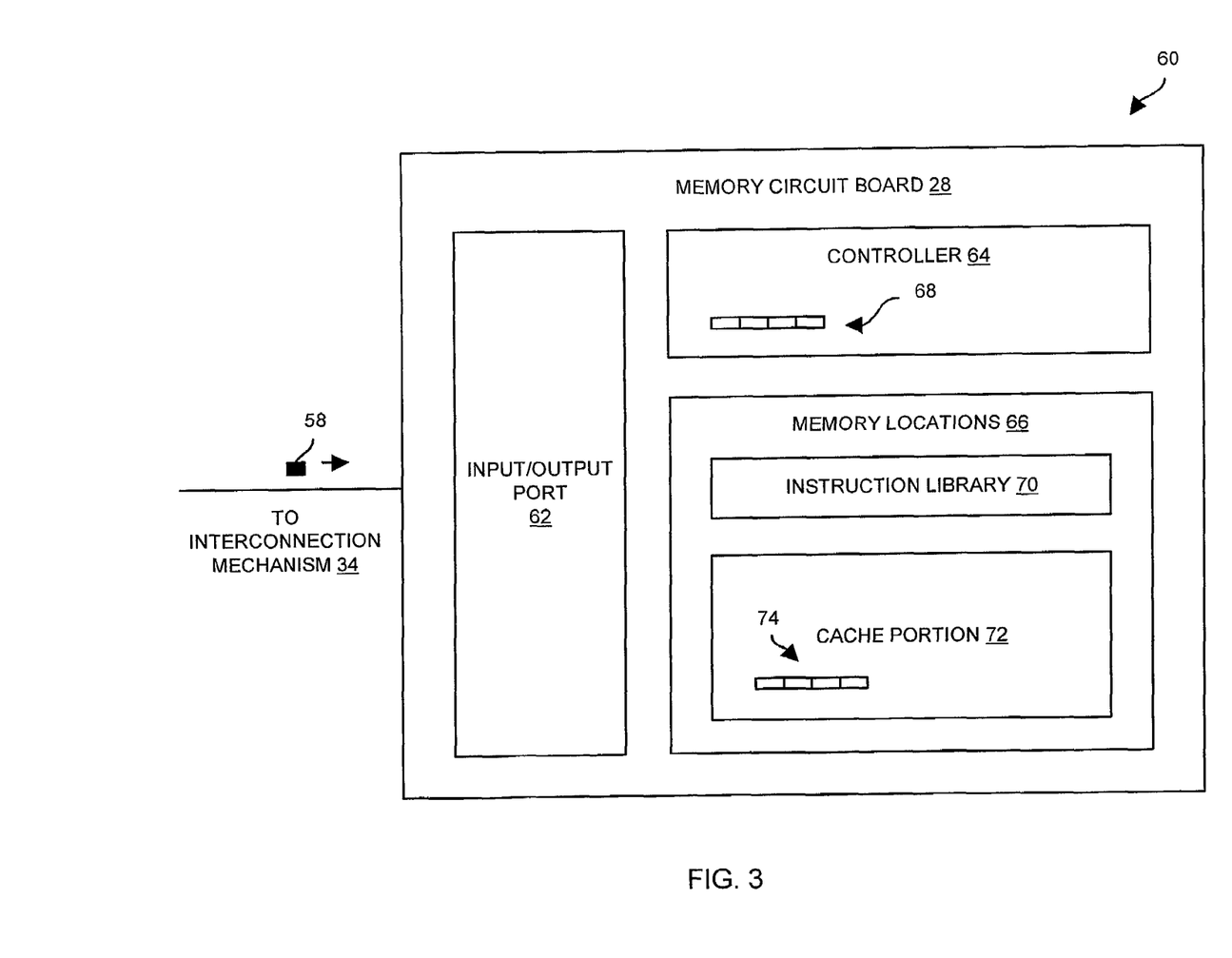
FIG. 3 is a block diagram of a memory circuit board of the data storage system of FIG. 1.

FIG. 3 is a block diagram 60 of a memory circuit board 28 of the data storage system 22. The memory circuit board 28 includes an I/O port 62, a controller 64 and a set of memory locations 66. The I/O port 62 connects with a processor circuit board 50 (e.g., a front-end interface 26, a back-end interface 30, etc.) through the interconnection mechanism 34. The controller 64 includes a set of registers 68 (e.g., general purpose registers) which are capable of holding parameters used when the memory circuit board 28 performs particular instructions. The set of memory locations 66 includes an instruction library 70 and at least a portion 72 of the cache 36 (also see FIG. 1). The instruction library 70 includes sections of code which are staggered at set entry points. The controller 66 can jump to any of those entry points in order to execute particular sections of code at those entry points. The cache portion 72 forms at least a portion of the cache 36 and includes cache slots 74 for storing copies of data elements 38 stored in the set of disk drives 32 (also, see FIG. 1).

The controller 64 is capable of performing a set of basic operations (e.g., e.g., load a data element, store a data element, etc.) in response to a set of basic commands (e.g., READ, WRITE, ADD and MASK-COMPARE-AND-SWAP commands) from a processor circuit board 50 through the I/O port 62. The controller 64 is further capable of receiving a communication 58 which includes a SCRIPT command and a payload from the processor circuit board 50. The SCRIPT command indicates that the payload includes a series of individual instructions. In response to the SCRIPT command, the memory circuit board 28 parses the payload to identify the series of individual instructions. The memory circuit board 28 then performs a series of operations in accordance with the identified series of individual instructions. Further details of the invention will now be provided with reference to FIG. 4.

Figure 4:
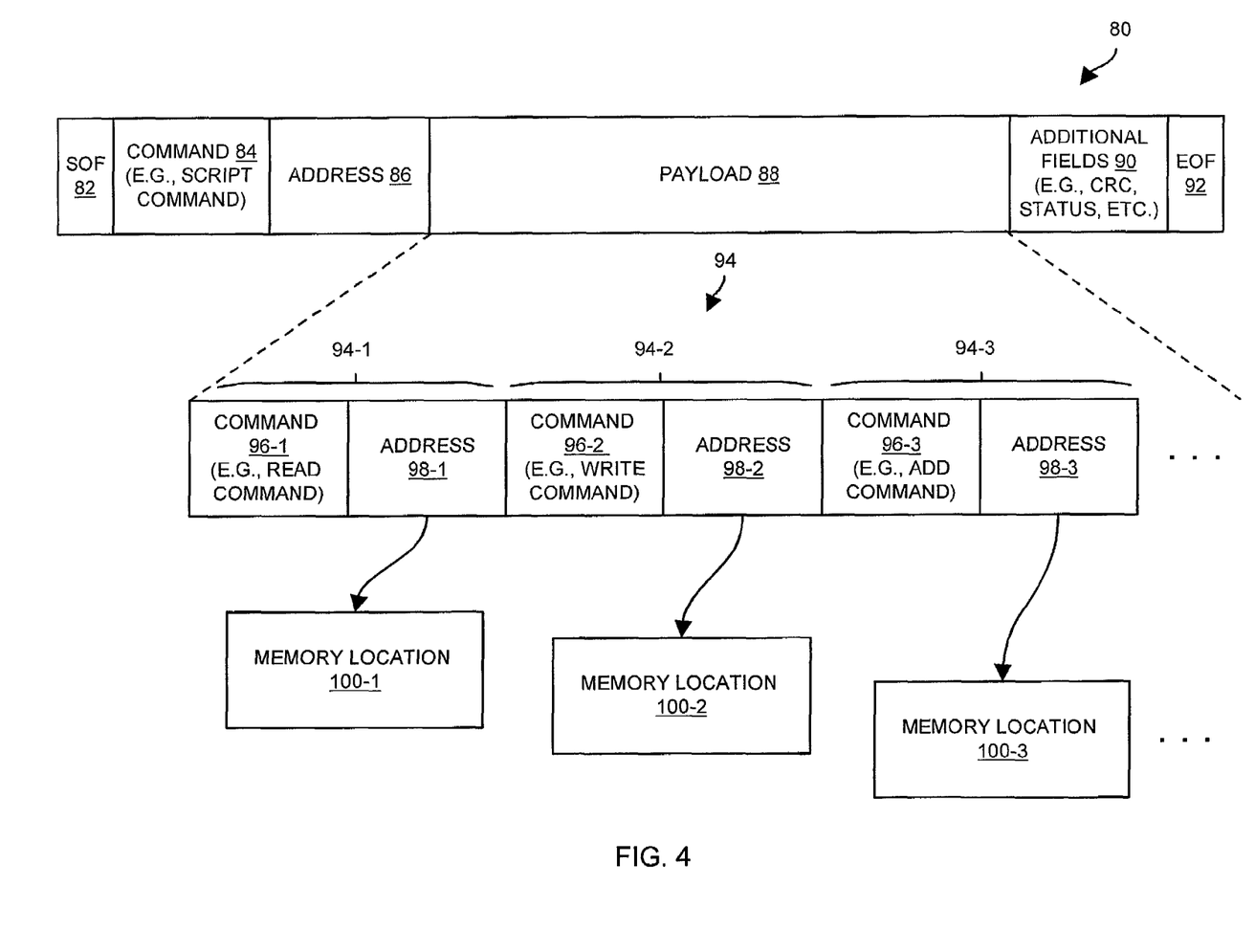
FIG. 4 is a block diagram of a format for a communication provided by the processor circuit board of FIG. 2 and handled by the memory circuit board of FIG. 3.

FIG. 4 is a block diagram of a format 80 for communications provided by a processor circuit board 50 (e.g., a front-end interface, a back-end interface, etc.) and handled by a memory circuit board 28. The format 80 includes a start-of-file (SOF) field 82, a command field 84, an address field 86, a payload field 88, a set of additional fields 90, and an end-of-file field 92.

For a basic command such as a MASK-COMPARE-AND-SWAP or a READ command, the SOF field 82 includes a special code (e.g., a unique bit pattern) indicating the start of a communication, the command field 84 includes a code indicating the type of command (e.g., READ, WRITE, etc.), the address field 86 includes an address associated with the type of command (e.g., a memory address for reading or writing a data element), the payload field 88 includes data (e.g., a data element to be stored in the cache portion 72), the set of additional fields 90 include control and status information (e.g., separate fields for holding error detection or correction codes, status codes, tags, etc.), and the EOF field 92 includes a special code (e.g., a unique bit pattern) indicating the end of the communication. In one arrangement, the data in the payload field 88 is the size of a data block (e.g., 512 bytes).

A discussion of similar formats which are suitable for use by the front-end and back-end interfaces 26, 30 and by the set of memory circuit boards 28 is provided in copending U.S. patent application Ser. No. 09/741,494 entitled "METHODS AND APPARATUS FOR TRANSFERRING A DATA ELEMENT WITHIN A DATA STORAGE SYSTEM," by the same inventor as in the present application and assigned to the same assignee as the present application, the teachings of which are hereby incorporated by reference in their entirety.

As mentioned above in connection with FIGS. 2 and 3, the processor circuit board 50 is capable of providing a communication 58 which includes a SCRIPT command and a payload, and the memory circuit board 28 is capable of handling the communication 58. In some arrangements, the communication 58 uses the format 80 of FIG. 4. In these arrangements, the command field 84 includes a bit pattern indicating that the communication 58 includes the SCRIPT command and that the payload field 88 includes a series of individual instructions 94 (see beneath the format 80 in FIG. 4).

As shown in FIG. 4, each of the series of individual instructions 94 may include a command field 96 and an address field 98. For example, the individual command 94-1 includes a command field 96-1 and an address field 98-1. Similarly, the individual command 94-2 includes a command field 96-2 and an address field 98-2, and so on. Although it is not necessary for each individual instruction 94, the address field 98 of each individual instruction 94 is capable of including a memory address (i.e., a pointer to cache slots 74 in the set of memory locations 66 in the memory circuit board 28) containing data (e.g., a data element) to be used by that individual instruction 94. For example, the address field 98-1 of the individual instruction 94-1 points to a memory location 100-1 (e.g., a cache slot 74 of the cache portion 72), the address field 98-2 of the individual instruction 94-2 points to a memory location 100-2 (e.g., another cache slot 74), and so on.

It should be understood that there may be data following the command such as "COMPARE 0x42" or "ADD 0x27". Further details of the invention will now be provided with reference to FIG. 5.

Figure 5:
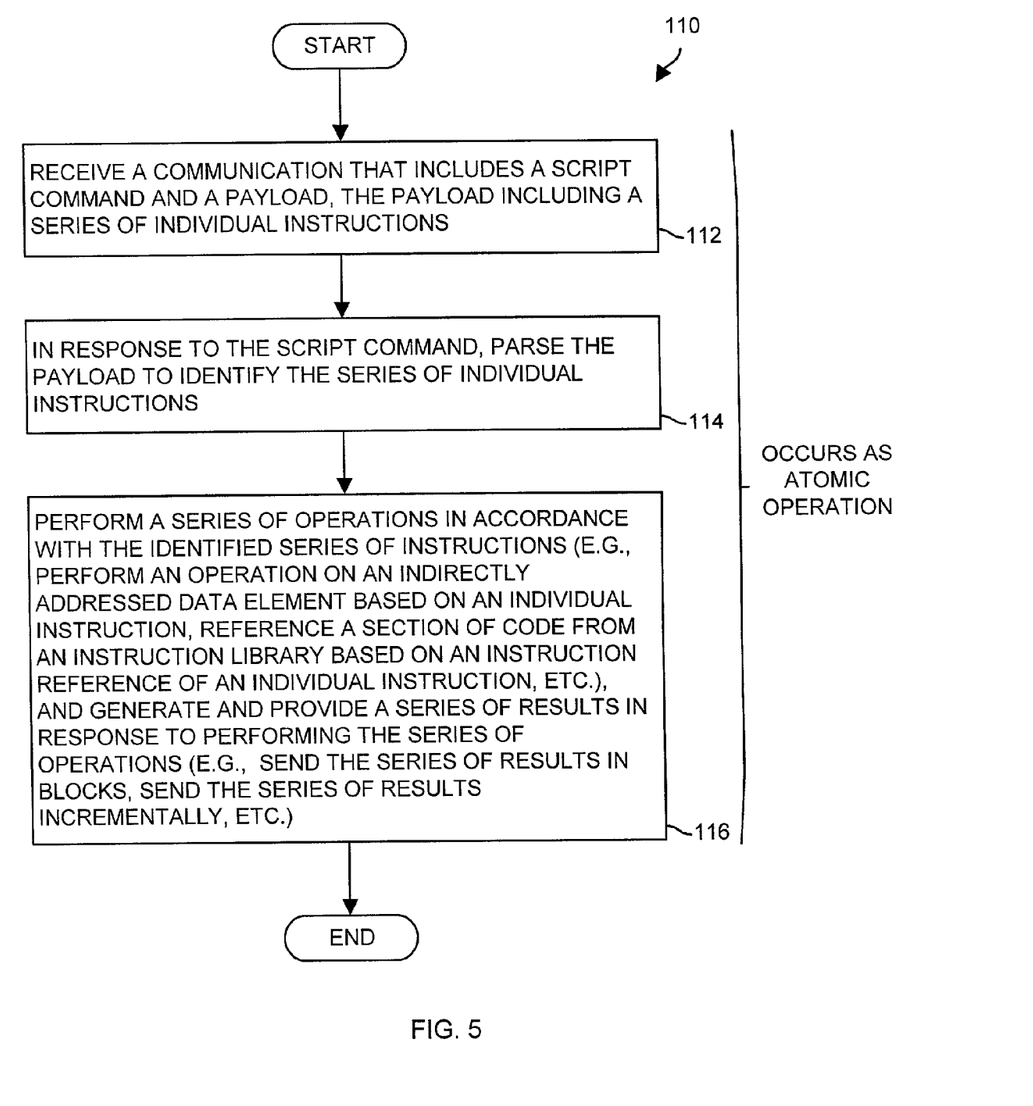
FIG. 5 is a flowchart of a procedure which is performed by the memory circuit board of FIG. 3 when handling the communication of FIG. 4.

FIG. 5 is a flowchart of a procedure 110 which is performed by the controller 64 of the memory circuit board 28 in response to a communication 58 containing the SCRIPT command. In step 112, the controller 64 receives the communication 58 (e.g., from a front-end interface 26, from a back-end interface 30, etc.). Although formats other than the format 80 of FIG. 4 are suitable for use by the data storage system 22, the following description assumes that the memory circuit board 28 uses the format 80 by way of example only. Accordingly, the communication 58 includes a SCRIPT command in the command field 84, and the payload field 88 includes a payload containing a series of individual commands 94.

In step 114, the controller 64 of the memory circuit board 28 identifies the command as the SCRIPT command (i.e., identifies the special bit sequence for the SCRIPT command), and parses the payload to identify the series of individual instructions 94 in response thereto. At this time, the controller 64 can perform other work as well such as checking the communication 58 for errors based on an error detection code stored in the additional fields 90 (see FIG. 4).

In step 116, the controller 64 performs a series of operations in accordance with the identified series of individual instructions 94 and generates a series of results in response to performing the series of operations. The controller 64 provides the series of results back to the source of the communication 58 (i.e., the processor circuit board 50) thus enabling the source to monitor the operation of the memory circuit board 28 (e.g., enabling the source to error check the operation of the memory circuit board 28, etc.). In response to a detected error, the source can instruct the memory circuit board 28 to perform a follow procedure such as an error handling operation, another attempt to perform the series of the operations, etc.

Since the memory circuit board 28 (FIG. 3) performs a series of operations in response to the parsed series of individual instructions 94 (FIG. 4) contained within the communication 58 (FIG. 3), the memory circuit board 28 can perform complex tasks (e.g., updating an LRU queue, updating a set of hash lists, etc.) without requiring several communications from the processor circuit board 50 (e.g., a front-end interface 26, a back-end interface 30, etc., and see FIGS. 1 and 2). Accordingly, delays associated with handshaking between the memory circuit board 28 (FIG. 1) and the processor circuit board 50 (FIG. 2) before and after each command and communication traffic is avoided, and response time for performing the series of operations is minimized.

In one arrangement, the processor circuit board 50 (FIG. 2) initially loads the memory circuit board 28 (FIG. 3) with the communication 58. The processor circuit board 50 then writes parameters to the set of registers 68 in the controller 64 of the memory circuit board 28 (i.e., to designated addresses). The controller 64 responds by performing the series of individual instructions 94 (FIG. 4) using the parameters written in the set of registers 68. The SCRIPT command can identify particular registers of the set of registers 68 using standard techniques for identifying general purpose registers within a processor (e.g., direct addressing techniques, indirect addressing techniques, etc.). Furthermore, the processor circuit board 50 can have the memory circuit board 28 re-perform the series of individual instructions 94 on a new data simply by writing a new set of parameters into the set of registers 68. Accordingly, the processor circuit board 50 does not need to send the communication 58 containing the SCRIPT command and the series of individual instructions 94 over and over again. Rather, the processor circuit board 50 can send the communication to the memory circuit board 28 once in order to program the operation of the memory circuit board 28, and subsequently load the set of registers 68 with parameters in a dynamic or on-the-fly manner, thus causing the memory circuit board 28 to repeat the operation on parameters.

By way of example only and with reference to FIG. 4, each instruction 94 includes an address field 98 that references a memory location 100. That is, the contents of each address field 98 point to a memory location 100 (e.g., for reading or writing data). It should be understood that indirect address schemes are suitable for use as well. For example, the contents of the command field 96 can store an indirect addressing SCRIPT command and the contents of the address field 98 can point to a memory location 100 that stores another address for data. By accessing the data in such an indirect addressing manner, the memory circuit board 28 can conveniently access content not contained within the communication 58 such as parameters which are used by the series of individual instructions 94, additional instructions and parameters for those additional instructions, and the like.

In some arrangements, the instruction 94 references an entry point in the instruction library 70 (FIG. 3). Accordingly, when the controller 64 encounters the first instruction 94-1, the controller 64 executes a section of code from the instruction library 70 based on the first instruction 94-1 to perform a first operation (e.g., reads a data element), and then returns to the series of individual instructions 94 to operate in accordance with another instruction 94. When the controller 64 encounters the second instruction 94-2, the controller 64 executes a section of code from the instruction library 70 based on the second instruction 94-2 to perform a second operation, returns to the series of individual instructions 94 to operate in accordance with another instruction 94, and so on. In one arrangement, the contents of the command fields 96 identify those entry points. In another arrangement, the contents of the address fields 98 identify those entry points.

It should be understood that, by referencing sections of code of the instruction library 70 in the above-described entry point manner, each individual instruction 94 is essentially a jump instruction to execute additional code (e.g., additional instructions). This arrangement provides flexibility to the designer and manufacturer of the data storage system 22. In particular, modifications (e.g., enhancements, problem fixes, etc.) can be made to the code sections by simply storing a new instruction library 70 over the original instructions library 70 (or new code sections over old code sections). No hardware modifications are needed.

As the controller 64 performs the series of operation in response to the series of individual instructions 94, the controller 64 generates a series of operation results. In one arrangement, the controller 64 provides the operations results incrementally (i.e., one at a time) back to the source of the communication 58 (i.e., the processor circuit board 50). This incremental arrangement is well-suited for configurations in which a dedicated communications mechanism is available between the memory circuit board 28 and the source (e.g., a point-to-point channel) since the source can obtain the results as soon as the results are available.

In another arrangement, the controller 64 packages the multiple results into data elements (e.g., blocks) and sends the data elements to back to the source. This packaging arrangement is well-suited for situation in which the communications mechanism between the memory circuit board 28 and the source is a shared resource (e.g., a common bus) since such packaging reduces the number of transmissions thus lowering traffic through the shared resource and its associated contention deficiencies (e.g., delays).

Figure 6:
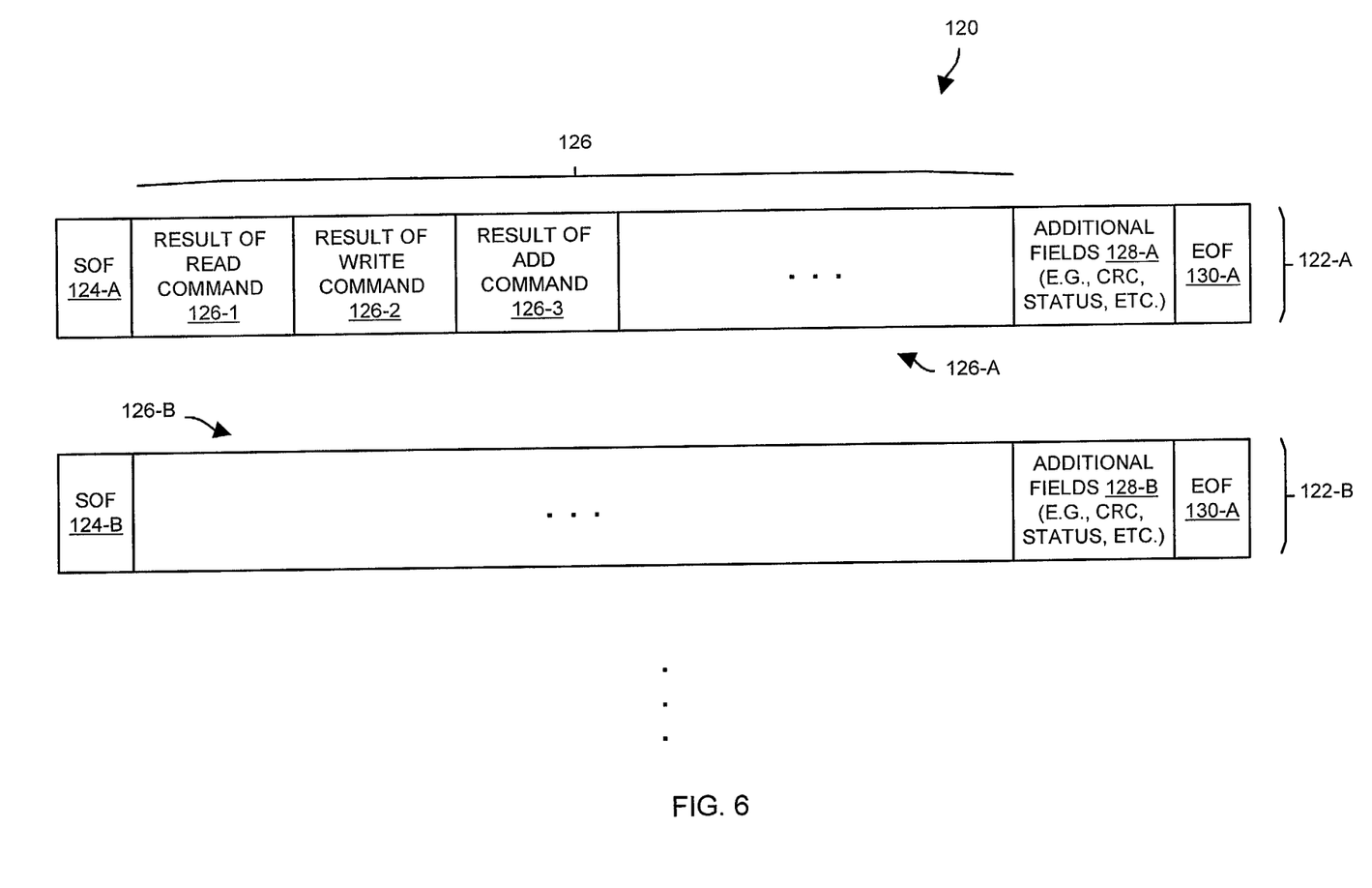
FIG. 6 is a block diagram of a format for a communication containing results from the memory circuit board of FIG. 3 in response to handling the communication of FIG. 4.

FIG. 6 shows a format 120 for the results in the above-described packaging arrangement. The format 120 includes a series of data element fields 122-A, 122-B, . . . (e.g., blocks) for containing results of performing the individual instructions 94-1, 94-2, . . . . Each data element field 122 includes an SOF field 124 containing the unique start-of-file code, a payload field 126 containing a series of results, a set of additional fields 128 for control and status information, and an EOF field 130 for containing the unique end-of-file code. For example, the data element field 122-A includes an SOF field 124-A, a payload field 126-A, a set of additional fields 128-A and an EOF field 130-A, and so on. The payload field 126-A includes a series of results 126-1, 126-2, 126-3, . . . resulting from the controller 64 performing the series of operations based on the series of individual instructions 94 (FIG. 4). When the payload field 126-A is full or after a predetermined amount of time has elapsed from the time that the memory circuit board 28 received the communication 58 containing the SCRIPT command and series of individual instructions 94, the controller 64 of the memory circuit board 28 sends the data element 122-A back to the source of the communication 58 through the I/O port 62 (FIG. 3). Similarly, when the payload field 126-B of a next data element 122-B is full or after another predetermined amount of time has elapsed, the controller 64 sends the data element 122-B to the source, and so on, until the memory circuit board 28 has completed the series of operations. In one arrangement, the controller 64 sends a final data element 122 to the source including any remaining unreported results in response to completing the series of operations rather than waiting for a predetermined amount of time to elapse.

It should be understood that the SCRIPT command is well-suited for complex tasks that require the memory circuit board 28 to perform multiple operations. For example, suppose that (i) the command in the command field 96-1 of the first individual instruction 94-1 is a READ command for reading a data element from the memory location 100-1 of the cache 72, the command in the command field 96-2 of the second individual instruction 94-2 is a WRITE command for writing that data element to another memory location 100-2, and the command in the command field 96-3 of the next individual instruction 94-3 is an ADD command for adding that data element to another data element residing at the memory location 100-3, and so on. The controller 64 can respond to the READ command in the command field 96-1 of the first individual instruction 94-1 by reading the data element from the memory location 100-1 addressed by the contents in the address field 98-1. Next, the controller 64 can respond to the WRITE command in the command field 96-2 of the second individual instruction 94-2 by writing that data element to the memory location 100-2 addressed by the contents of the address field 98-2. Then, the controller 64 can add the written data element to another data element residing in the memory location 100-3 addressed by the contents of the address field 98-3, and so on.

The above-described technique does not require incremental handshaking between the memory circuit board 28 and the source of the communication 58 after the memory circuit board 28 performs each operation. Accordingly, the memory circuit board 28 (i) can perform the series of operation more quickly than conventional configurations that use such handshaking after every operation, and (ii) does not suffer from the substantial delays associated with such conventional configurations (e.g., bus contention delays, handshaking delays, etc.).

It should be further understood that memory circuit board 28 can attend to the SCRIPT command in an atomic manner. That is, in one arrangement, the controller 64 of the memory circuit board performs the series of operations in accordance with the series of individual instructions 94 atomically (i.e., without interruption). As a result, the operation of the memory circuit board 28 is well-suited for complex tasks such as updating shared data structures (e.g., an LRU queue, a hash list, a track table, etc.) which would otherwise require the use of specialized locking techniques (e.g., test-and-set mechanisms, semaphores, etc.) which require relatively large amount of overhead (e.g., additional memory, CPU cycles, etc.).

Embodiments of the invention are well-suited for tasks that access a shared data structure such as a shared doubly linked list. Similar tasks are described in a copending U.S. patent application Ser. No. 09/972,321 filed on even date herewith and entitled "METHODS AND APPARATUS FOR ACCESSING A DOUBLY LINKED LIST IN A DATA STORAGE SYSTEM," by the same inventor as in the present application and assigned to the same assignee as the present application, the teachings of which are hereby incorporated by reference in their entirety.

Additionally, embodiments of the invention are well-suited for tasks that access a shared set of hash lists. Similar tasks are described in a copending U.S. patent application Ser. No. 09/972,314 filed on even date herewith and entitled "METHODS AND APPARATUS FOR ACCESSING DATA ELEMENTS USING IMPROVED HASHING TECHNIQUES," by the same inventor as in the present application and assigned to the same assignee as the present application, the teachings of which are hereby incorporated by reference in their entirety.

As described above, embodiments of the invention are directed to a data storage system 22 that utilizes a memory circuit board 28 which is configured to perform a series of operations in response to a communication 58 having a script command and a payload (e.g., a series of individual instructions). The use of such a memory circuit board 28 enables processor circuit boards 50 (e.g., front-end and back-end interfaces 26, 30 of the data storage system 22) to avoiding sending a large number of communications to the memory circuit board 28 when directing the memory circuit board 28 to perform a series of operations. Accordingly, complex tasks such as updating an LRU queue or updating a set of hash lists can be accomplished with a few communications (e.g., a single communication 58) from another circuit board (e.g., a processor circuit board 50) to the memory circuit board 28. The features of the invention, as described above, may be employed in electronic systems, components and procedures such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that a processor circuit board 50 was described as including a single interface (e.g., a front-end interface 26, a back-end interface 30, etc.) by way of example only. In some arrangements, a processor circuit board 50 includes multiple processing circuits. For example, in one arrangement, a processor circuit board 50 includes multiple front-end interfaces 26 (e.g., two, four, etc.). In another arrangement, a processor circuit board 50 includes multiple back-end interfaces 30 (e.g., two, four, etc.). In yet another one arrangement, a processor circuit board 50 includes both front-end and back-end interfaces 26, 30 (e.g., a front-end interface 26 and a back-end interface 30, two front-end interfaces 26 and two back-end interfaces 30, etc.).

Additionally, it should be understood that the memory circuit board 28 was described above as including a single I/O port 62 by way of example only. In another arrangement, the memory circuit board 28 includes multiple I/O ports 62 (e.g., for point-to-point channels between the memory circuit board 28 and multiple processor circuit boards 50).

Furthermore, it should be understood that the memory circuit boards 28 were described are residing in a data storage system 22 by way of example only. The memory circuit boards 28 are suitable for use in other electronic devices and systems as well such as general purpose computers, specialize computers, etc.

Additionally, it should be understood that the instruction library 70 (FIG. 3) was shown as being stored in the memory locations 66 of the memory circuit board 28 by way of example only. In some arrangements, the instruction library 70 is contained within memory inside the controller 64 for faster access.

Furthermore, it should be understood that the invention was described above using instructions such as READ and WRITE. Other more complex operations can be used as well in the series of instructions 94 such as COMPARE, BRANCH, ABORT, AND, OR, XOR, INVERT, NEGATE, etc.

Additionally, it should be understood that the format 80 (FIG. 4) included SOF and EOF delimiters by way of example only. Other communications protocols are suitable for use as well such as communications without delimiters but which are accompanied by asserted lines, or other delimiters.

Furthermore, it should be understood that the SCRIPT command is just one example of a command that uses a series of individual instructions 94. Other similar commands can be used as well and are intended to be covered by the invention such as a STORE_SCRIPT command which stores but does not run a script (i.e., a series of individual instructions 94), EXEC_SCRIPT which executes a script, and INVALIDATE_SCRIPT which invalidates a script.

Additionally, it should be understood that the controller 64 for the memory circuit board 28 was shown as residing within the memory circuit board 28 by way of example only. In other arrangements, the controller 64 resides elsewhere. For example, the controller 64 can reside in another memory circuit board 28, in a separate circuit board, etc. In some arrangements, the controller 64 can reside anywhere along any intermediate point (e.g., anywhere between the processor circuit board 50 and the memory locations 66).

Furthermore, it should be understood that the writing of data can be included with the sending of a script command and a series of instructions 94. That is, in the same communication, there is a complete transaction including a script command, a series of individual instructions 94 and data to be used by the series of individual instructions 94. Such modifications and enhancements are intended to be part of embodiments of the invention, and the invention should be limited only by the spirit and scope of the claims.

What is claimed is:

1. In a data storage system having (a) a set of storage devices, (b) a memory circuit board that includes (1) a cache to temporarily store copies of data elements stored in the set of storage devices, and (2) a shared data structure utilized in managing the use of the cache, and (c) a processor circuit board that operates as at least one of a front-end interface between an external device and the cache and a back-end interface between the cache and the set of storage devices, the processor circuit board being operative with the memory circuit board to perform memory operations including (1) a basic operation to manipulate a memory location of the memory circuit board, and (2) a complex operation to manipulate the shared data structure, a method by which the memory circuit board performs its part of the memory operations, comprising:

(i) receiving from the processor circuit board a communication that includes a command field and a payload field;
   (ii) determining whether the command field contains a basic write command or a script command, the basic write command being present when the communication is generated by the processor circuit board as part of the basic operation, the script command being present when the communication is generated as part of the complex operation;
   (iii) if the command field of the communication contains the basic write command, then writing data from the payload field of the communication into the memory location; and
   (iv) if the command field of the communication contains the script command, then performing the following steps:
      parsing the payload of the communication to identify a series of individual instructions; and
      performing a series of operations on the shared data structure according to the series of individual instructions.

2. The method of claim 1 wherein the cache includes memory locations which store a data element, wherein an individual instruction of the series of individual instructions includes an address referencing the memory locations which store the data element, and wherein the step of performing the series of operations includes the steps of:
   selecting the data element based on the address of the individual instruction;
   retrieving the data element from the memory locations of the cache; and
   performing an operation based on the individual instruction, the operation using the data element as at least one parameter of the operation.

3. The method of claim 1 wherein the memory circuit board further stores an instruction library, wherein the series of individual instructions includes an instruction reference that points to a section of code of the instruction library, and wherein the step of performing the series of operations includes the steps of:
  referencing the section of the code of the instruction library based on the instruction reference; and
  executing the section of code.

4. The method of claim 1 wherein the steps of parsing and performing occur as an atomic operation.

5. The method of claim 1, further comprising the step of:
  generating a series of results in response to performing the series of operations; and
  providing the series of results to a processor circuit board.

6. The method of claim 5 wherein the step of providing the series of results to the processor circuit board includes the steps of:
  packaging the series of results in a set of data blocks; and
  transferring the set of data blocks to the processor circuit board.

7. The method of claim 1, further comprising the step of:
  loading a set of parameters into a set of registers of the memory circuit board to enable the set of parameters to be used when performing the series of operations.

8. The method of claim 1 wherein the series of individual instructions of the payload has a positional order, and wherein the step of performing the series of operations includes the step of:
  processing the series of individual instructions in the positional order within the memory circuit board to effectuate temporary caching of data within the memory circuit board, the data being en route between an external host and a set of disk drives of the data storage system.

9. The method of claim 8 wherein the step of receiving the communication includes the step of:
  acquiring the communication including the script command and the payload, which has the series of individual instructions, from a processor circuit board through a multi-drop bus which is configured to carry communications between multiple processor circuit boards and multiple memory circuit boards of the data storage system, the processor circuit board being configured to exert control over the memory circuit board using the script command and payload.

10. The method of claim 9 wherein the step of processing the series of individual instructions in the positional order within the memory circuit board includes the step of:
  completely carrying out a complex task in an atomic manner, the complex task resulting from execution of each individual instruction of the series of individual instructions in the positional order.

11. A data storage system, comprising:
  (a) a set of storage devices;
  (b) a memory circuit board that includes (1) a cache to temporarily store copies of data elements stored in the set of storage devices, and (2) a shared data structure utilized in managing the use of the cache; and
  (c) a processor circuit board that operates as at least one of a front-end interface between an external device and the cache and a back-end interface between the cache and the set of storage devices, the processor circuit board being operative with the memory circuit board to perform memory operations including (1) a basic operation to manipulate a memory location of the memory circuit board, and (2) a complex operation to manipulate the shared data structure;
  wherein the memory circuit board is configured to perform the following steps in conjunction with its part of the memory operations:
    (i) receiving from the processor circuit board a communication that includes a command field and a payload field;
    (ii) determining whether the command field contains a basic write command or a script command, the basic write command being present when the communication is generated by the processor circuit board as part of the basic operation, the script command being present when the communication is generated as part of the complex operation;
    (iii) if the command field of the communication contains the basic write command, then writing data from the payload field of the communication into the memory location; and
    (iv) if the command field of the communication contains the script command, then performing the following steps:
      parsing the payload of the communication to identify a series of individual instructions; and
      performing a series of operations on the shared data structure according to the series of individual instructions.

12. The data storage system of claim 11 wherein the cache includes memory locations which store a data element, wherein an individual instruction of the series of individual instructions includes an address referencing the memory locations which store the data element, and wherein the memory circuit board is configured to perform at least a portion of the series of operations by:
  selecting the data element based on the address of the individual instruction;
  retrieving the data element from the memory locations of the cache; and
  performing an operation based on the individual instruction, the operation using the data element as at least one parameter of the operation.

13. The data storage system of claim 11 wherein the memory circuit board further stores an instruction library, wherein the series of individual instructions includes an instruction reference that points to a section of code of the instruction library, and wherein the memory circuit board is configured to perform at least a portion of the series of operations by:
  referencing the section of the code of the instruction library based on the instruction reference; and
  executing the section of code.

14. The data storage system of claim 11 wherein the memory circuit board is configured to receive the communication, parse the payload, and perform the series of operations as an atomic operation.

15. The data storage system of claim 11 wherein the memory circuit board is further configured to:
  generate a series of results in response to performing the series of operations; and
  provide the series of results to the processor circuit board.

16. The data storage system of claim 15 wherein the memory circuit board is configured to provide the series of results by:
  packaging the series of results in a set of data blocks; and
  transferring the set of data blocks to the processor circuit board.

17. The data storage system of claim 11 wherein the memory circuit board is further configured to:
 load a set of parameters into a set of registers of the memory circuit board to enable the set of parameters to be used when performing the series of operations.

18. The data storage system of claim 11 wherein the series of individual instructions of the payload has a positional order, and wherein the memory circuit board, when performing the series of operations, is configured to:
 process the series of individual instructions in the positional order within the memory circuit board to effectuate temporary caching of data within the memory circuit board, the data being en route between an external host and a set of disk drives of the data storage system.

19. The data storage system of claim 18 wherein the memory circuit board, when receiving the communication, is configured to:
 acquire the communication including the script command and the payload, which has the series of individual instructions, from the processor circuit board through a multi-drop bus which is configured to carry communications between multiple processor circuit boards and multiple memory circuit boards of the data storage system, the processor circuit board being configured to exert control over the memory circuit board using the script command and payload.

20. The data storage system of claim 19 wherein the memory circuit board, when processing the series of individual instructions in the positional order, is configured to:
 completely carry out a complex task in an atomic manner, the complex task resulting from execution of each individual instruction of the series of individual instructions in the positional order.

21. A memory circuit board for a data storage system, comprising:
 (a) an input/output port to connect with a processor circuit board of the data storage system, the processor circuit board being operative with the memory circuit board to perform memory operations including (1) a basic operation to manipulate a memory location of the memory circuit board, and (2) a complex operation to manipulate a shared data structure utilized in managing the use of the cache;
 (b) a set of memory locations, at least some of the memory locations forming (1) a cache to temporarily store copies of data elements stored in a set of storage devices of the data storage system, and (2) the shared data structure; and
 (c) a controller coupled to the input/output port and the set of memory locations, wherein the controller is configured to:
  (i) receive from the processor circuit board a communication that includes a command field and a payload field;
  (ii) determine whether the command field contains a basic write command or a script command, the basic write command being present when the communication is generated by the processor circuit board as part of the basic operation, the script command being present when the communication is generated as part of the complex operation;
  (iii) if the command field of the communication contains the basic write command, then write data from the payload field of the communication into the memory location; and
  (iv) if the command field of the communication contains the script command, then perform the following steps:
   parsing the payload of the communication to identify a series of individual instructions; and
   performing a series of operations on the shared data structure according to the series of individual instructions.

22. The memory circuit board of claim 21 wherein the cache includes memory locations which store a data element, wherein an individual instruction of the series of individual instructions includes an address referencing the memory locations which store the data element, and wherein the controller is configured to perform at least a portion of the series of operations by:
 selecting the data element based on the address of the individual instruction;
 retrieve the data element from the memory locations of the cache; and
 perform an operation based on the individual instruction, the operation using the data element as at least one parameter of the operation.

23. The memory circuit board of claim 21 wherein the set of memory locations holds an instruction library, wherein the series of individual instructions includes an instruction reference that points to a section of code of the instruction library, and wherein the controller is configured to perform at least a portion of the series of operations by:
 referencing the section of the code of the instruction library based on the instruction reference; and
 executing the section of code.

24. The memory circuit board of claim 21 wherein the memory circuit board is configured to receive the communication, parse the payload, and perform the series of operations as an atomic operation.

25. The memory circuit board of claim 21 wherein the controller is further configured to:
 generate a series of results in response to performing the series of operations; and
 provide the series of results to the processor circuit board.

26. The memory circuit board of claim 25 wherein the controller is configured to provide the series of results by:
 packaging the series of results in a set of data blocks; and
 transferring the set of data blocks to the processor circuit board.

27. The memory circuit board of claim 21 wherein the controller is further configured to:
 load a set of parameters into a set of registers of the memory circuit board to enable the set of parameters to be used when performing the series of operations.

28. The memory circuit board of claim 21 wherein the series of individual instructions of the payload has a positional order, and wherein the controller, when performing the series of operations, is configured to:
 process the series of individual instructions in the positional order within the memory circuit board to effectuate temporary caching of data within the memory circuit board, the data being en route between an external host and a set of disk drives of the data storage system.

29. The memory circuit board of claim 28 wherein the controller, when receiving the communication, is configured to:
 acquire the communication including the script command and the payload, which has the series of individual instructions, from the processor circuit board through a multi-drop bus which is configured to carry communications between multiple processor circuit boards and multiple memory circuit boards of the data storage system, the processor circuit board being configured to exert control over the memory circuit board using the script command and payload.

30. The memory circuit board of claim 29 wherein the controller, when processing the series of individual instructions in the positional order, is configured to:

completely carry out a complex task in an atomic manner, the complex task resulting from execution of each individual instruction of the series of individual instructions in the positional order.

31. A processor circuit board for a data storage system, comprising:

(a) an input/output port to connect with a memory circuit board of the data storage system, the memory circuit board including memory locations for forming (1) a cache to temporarily store copies of data elements stored in a set of storage devices, and (2) a shared data structure utilized in managing the use of the cache; and (b) control circuitry coupled to the input/output port, wherein the control circuitry is configured (i) to perform, with the memory circuit board, memory operations including (1) a basic operation to manipulate a memory location of the memory circuit board, and (2) a complex operation to manipulate the shared data structure, and (ii) to provide a respective communication to the memory circuit board through the input/output port in conjunction with each of the basic operation and the complex operation, each communication including a command field and a payload field, the communication including a basic write command in the command field and write data in the payload field when provided in conjunction with the basic operation, the write data to be written into the memory location of the memory circuit board, the communication including a script command in the command field and a series of individual instructions in the payload field when provided in conjunction with the complex operation, the series of individual instructions indicating a corresponding series of operations to be performed on the shared data structure.

32. The processor circuit board of claim 31 wherein the series of individual instructions of the payload has a positional order, and wherein the control circuitry, providing the communication, is configured to:

output the series of individual instructions in the positional order to the memory circuit board to effectuate temporary caching of data within the memory circuit board, the data being en route between an external host and a set of disk drives of the data storage system.

33. The processor circuit board of claim 32 wherein the control circuitry, when outputting the communication, is configured to:

send the communication including the script command and the payload, which has the series of individual instructions, from the processor circuit board through a multi-drop bus which is configured to carry communications between multiple processor circuit boards and multiple memory circuit boards of the data storage system, the control circuitry being configured to exert control over the memory circuit board using the script command and payload.

* * * * *